United States Patent [19]
Sawabe et al.

[11] Patent Number: 6,031,962
[45] Date of Patent: *Feb. 29, 2000

[54] INFORMATION RECORD MEDIUM, APPARATUS FOR RECORDING THE SAME AND APPARATUS FOR REPRODUCING THE SAME

[75] Inventors: Takao Sawabe, Tokyo-to; Ryuichiro Yoshimura; Junichi Yoshio, both of Tokorozawa; Akihiro Tozaki, Tsurugashima; Yoshiaki Moriyama, Tsurugashima; Kaoru Yamamoto, Tsurugashima, all of Japan

[73] Assignee: Pioneer Electronics Corporation, Tokyo-to, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/815,956

[22] Filed: Mar. 13, 1997

[30] Foreign Application Priority Data

Mar. 14, 1996 [JP] Japan ................................ P08-057757

[51] Int. Cl.⁷ .............................. H04N 5/91; H04N 5/781
[52] U.S. Cl. .............................................. 386/96; 386/125
[58] Field of Search ................................... 386/83, 46, 96, 386/95, 92, 1, 109, 111, 112, 52, 106, 125, 26, 4, 27, 33, 82; 360/32; H04N 5/91, 5/781

[56] References Cited

U.S. PATENT DOCUMENTS 5,260,788  11/1993  Takano et al. ............................ 386/83
5,541,738   7/1996  Mankovitz ................................ 386/83
5,630,006   5/1997  Hirayama et al. ........................ 386/92

Primary Examiner—Robert Chevalier
Attorney, Agent, or Firm—Morgan, Lewis & Bockius LLP

[57] ABSTRACT

There is provided an information record medium on which information is recorded so as to permit, even when a reading-out error occurs, subsequent reproduction, an apparatus for recording the same and an apparatus for reproducing the same. According to the recording apparatus of the present invention, there are recorded, on the information record medium of the present invention, data groups provided with data units having at least one of video information and audio information, and reproduction control information having the first identification information for identifying each data group; and the second identification information for identifying the data group to which each data unit belongs, is recorded in each data unit. According to the reproduction apparatus of the present invention, when there is selected a data group comprising data units, there are consecutively read out the first identification information for identifying the selected data group and the second identification information for identifying the data group recorded in the data unit, to which the data unit belongs, and there is reproduced information of the data unit having the second identification information identical with the first identification information.

15 Claims, 13 Drawing Sheets

PHYSICAL STRUCTRE OF RECORD INFORMATION
(PHYSICAL FORMAT)

LOGICAL STRUCTRE OF RECORD INFORMATION
(LOGICAL FORMAT)

FIG. 8

| PROGRAM CHAIN GENERAL INFORMATION (PGC_GI) |
|---|
| PROGRAM CHAIN NAVIGATION COMMAND TABLE (PGC_NVCMDT) |
| PROGRAM CHAIN PROGRAM MAP (PGC_PGMAP) |
| CELL PLAYBACK INFORMATION TABLE (C_PBIT) |
| CELL POSITION INFORMATION TABLE (C_POSIT) |

FIG.10

| DSI_GI | CONTENTS | BYTE NUMBER |
|---|---|---|
| (1) NV_PCK_SCR | SCR OF NV_PCK | 4 |
| (2) NV_PCK_LBN | LBN OF NV_PCK | 4 |
| (3) VOBU_EA | END ADDRESS OF VOBU | 4 |
| (4) VOBU_1STREF_EA | FIRST REFERENCE PICTURE END ADDRESS | 4 |
| (5) VOBU_2NDREF_EA | SECOND REFERENCE PICTURE END ADDRESS | 4 |
| (6) VOBU_3RDREF_EA | THIRD REFERENCE PICTURE END ADDRESS | 4 |
| (7) BOBU_VOB_IDN | ID NUMBER OF VOB | 2 |
| SPARE | SRSV (0) | 1 |
| (8) VOBU_C_IDN | ID NUMBER OF CELL | 1 |
| (9) C_ELTM | CELL PASSING TIME | 4 |
| (Total) | | 32 |

INFORMATION RECORD MEDIUM, APPARATUS FOR RECORDING THE SAME AND APPARATUS FOR REPRODUCING THE SAME

BACKGROUND OF THE INVENTION

1. Field of the Invention

The present invention relates to an information record medium such as an optical disk of a high recording density type, which is capable of recording information such as video information, audio information and the like at a high density, and which is represented by a DVD (Digital Video or Versatile Disk). The present invention also relates to a recording apparatus for recording the information onto the information record medium, and a reproducing apparatus for reproducing the information from the information record medium.

2. Description of the Related Art

Conventionally, a so-called ID (Laser Disk) and a so-called CD (Compact Disk) are generalized as optical disks, on which information such as video information, audio information and the like is recorded.

On the ID or the like, the video information and the audio information are recorded together with time information indicating a time at which each information is to be reproduced with respect to a reproduction start position, which each ID or the like has, as a standard position. Thus, other than a general normal reproduction to reproduce the recorded information in the order of recording, various special reproductions are possible, such as a reproduction to extract and listen to an only desirable music out of a plurality of recorded musics, a reproduction to listen to the recorded musics in a random order and soon, in case of the CD, for example.

However, there is a problem that, according to the above mentioned LD or the like, a so-called interactive and variegated reproduction is not possible in which the audience can have a plurality of selection branches as for the video or audio information to be displayed or sound-outputted and in which the audience can select them to watch or listen to it.

More specifically, when watching and listening are directed to a foreign movie recorded on an LD, it is impossible to select a language used in a superimposed dialogue displayed on a screen (for example, to select superimposed dialogues in both of the Japanese and original languages) to display them on a screen, or when listening is directed to music recorded on a CD, it is impossible to select a kind of sound or voice in the music (for example, to make alternate selection of lyrics in English language version and Japanese language version for listening).

A movie production has often been subjected to different cutting processes to prepare the same-titled movies in different versions such as a theater version, an original version and the like. When there has been made an attempt to record simultaneously the same-titled movies in different versions on an LD or the like, it has been necessary to make a duplicate record of common portions thereof in order to permit reproduction without interruption. Accordingly, the same-titled movies have actually been compelled to be recorded on separate disks. It has therefore been impossible for a user to select a different version of the same-titled movies to enjoy it in a single disk.

It has also been impossible to record a plurality of simultaneously advancing pictures in a single story. It has therefore been impossible to make a free choice of, for example, one of a plurality of pictures obtained at different camera angles to enjoy it.

The interactive and variegated reproduction can be achieved by recording, on a navi-pack in an interleaved unit described later, amend address of the interleaved unit and a start address of the next interleaved unit, and reading them out.

When the navi-pack cannot be read out or a reading-out error occurs for some reason or other, it becomes impossible to identify which data already being selected (for example, the "theater version" or the "original version" in the above-mentioned example) corresponds to data (real time data) on a disk, which are now being read out, and subsequent reproduction cannot be achieved. When information for a period of one hour is recorded on an interleave structure, only a failure in reading out the first logical address may cause reproduction to be completely impossible for a subsequent period of one hour.

SUMMARY OF THE INVENTION

It is therefore an object of the present invention to provide an information recording apparatus in which, even when there occurs a problem of a failure of reading out or a reading out error, information can be recorded so as to be reproducible even after the occurrence of such a problem, and an information record medium on which information can be recorded by means of the above-mentioned information recording apparatus; and an information reproduction apparatus which permits reproduction even after the occurrence of problem of the failure of reading out or the reading out error.

According to one aspect of the present invention, there is provided an information record medium, whose information is to be reproduced by means of an information reproduction apparatus which is provided with a selecting means for selecting one of data groups each comprising a plurality of data units, and reads out a first identification information for identifying the selected data group, as well as, sequentially reads out a second identification information for identifying the data group which is recorded in the data unit and to which the data unit belongs, and reproduces information of the data unit having the second identification information which is identical with the first identification information, wherein: the information record medium is provided with (1) a plurality of data groups provided with a plurality of data units having at least one of video information and audio information and (2) reproduction control information having the first identification information for identifying each of the plurality of data groups; and the second identification information for identifying the data group to which each of the data units belongs, is recorded in each of the data units.

In accordance with the information record medium thus constructed, there is provided (1) a plurality of data groups provided with a plurality of data units having at least one of video information and audio information and (2) reproduction control information having the first identification information for identifying each of the plurality of data groups; and the second identification information for identifying the data group to which each of the data units belongs, is recorded in each of the data units, and the information recorded on the information record medium can therefore be reproduced by means of the information reproduction apparatus having the above-mentioned construction in a manner as mentioned below. At first, when one of the data groups comprising a plurality of data units is selected by means of the selecting means, the first identification information for identifying the thus selected data group is read out, and the second identification information for identifying the data group which is recorded in the data unit, and to which the data unit belongs, is sequentially read out. There is achieved reproduction of information of the data unit having the second identification information which is identical with the first identification information.

According to another aspect of the present invention, there is provided an information recording apparatus for recording information on an information record medium, whose information is to be reproduced by means of an information reproduction apparatus which is provided with a selecting means for selecting one of data groups each comprising a plurality of data units, and reads out a first identification information for identifying the selected data group, as well as, sequentially reads out a second identification information for identifying the data group which is recorded in the data unit and to which the data unit belongs, and reproduces information of the data unit having the second identification information which is identical with the first identification information, said apparatus comprising: a first recording means for recording a plurality of data groups including a plurality of data units having at least one of video information and audio information, and reproduction control information having the first identification information for identifying each of the plurality of data groups, on the information record medium; and a second recording means for recording the second identification information for identifying the data group to which each of the data units belongs, on each of the data units.

In accordance with the information recording apparatus thus constructed, (1) a plurality of data groups including a plurality of data units having at least one of video information and audio information and (2) reproduction control information having the first identification information for identifying each of the plurality of data groups, are recorded on the information record medium by means of the first recording means, and the second identification information for identifying the data group to which each of the data units belongs, is recorded on each of the data units by means of the second recording means. The information recorded on the information record medium can be reproduced by means of the information reproduction apparatus having the above-mentioned construction in a manner as mentioned below. More specifically, when one of the data groups comprising a plurality of data units is selected by means of the selecting means of the information reproduction apparatus, the first identification information for identifying the thus selected data group is read out, and the second identification information for identifying the data group which is recorded in the data unit, and to which the data unit belongs, is sequentially readout. There is achieved reproduction of information of the data unit having the second identification information which is identical with the first identification information.

According to still another aspect of the present invention, there is provided an information reproduction apparatus for reproducing information from an information record medium which has a plurality of data groups including a plurality of data units having at least one of video information and audio information, and reproduction control information having the first identification information for identifying each of the plurality of data groups, and in which medium second identification information for identifying the data group to which each of the data units belongs, is recorded on each of the data units, said apparatus comprising: a selecting means for selecting a single data group from the plurality of data groups; a first information read out means for reading out the first identification information for identifying the selected data group, from the reproduction control information; a second information read out means for sequentially reading out the second identification information of each of the data units; a judging means for judging identity of the first identification information read-out with the second identification information read-out; and a reproduction means for reproducing information from the data unit having the second identification information read-out which is identical with the read-out first identification information, when the first identification information read-out and the second identification information read-out are judged to be identical with each other.

In accordance with the information reproduction apparatus thus constructed, upon reproducing the information from the information record medium which has (1) a plurality of data groups provided with a plurality of data units having at least one of video information and audio information and (2) reproduction control information having the first identification information for identifying each of the plurality of data groups, and in which medium the second identification information for identifying the data group to which each of the data units belongs, is recorded on each of the data units, a single data group of the plurality of data groups is selected by means of the selecting means, and the first identification information for identifying the thus selected data group is read out from the reproduction control information by means of the first information read out means. Then, the second identification information of each of the data units is sequentially read out by means of the second information read out means. The identity of the first identification information as read-out with the second identification information as read-out is judged by means of the judging means. When the first identification information as read-out and the second identification information as read-out are judged to be identical with each other, the information from the data unit having the second identification information as read-out which is identical with the first identification information as read-out is reproduced by means of the reproduction means.

The nature, utility and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 1A is a perspective view of the DVD in FIG. 1.

FIG. 8 shows an example of a data structure of PCGI;

FIG. 10 shows data search information in real time data;

DETAILED DESCRIPTION OF THE PREFERRED EMBODIMENTS

Referring to the accompanying drawings, embodiments of the present invention will be now explained. The following explanations will be done for the embodiments, in which the present invention is applied to the aforementioned DVD.

In the following embodiments, constitutional elements listed on a right hand side in a following list respectively construct examples of constitutional elements of the present invention listed on a left hand side in the following list.

Data group: VOD (Video Object)
First identification information: VOB_ID
Second identification information: VOB_ID'
Data unit: Interleaved unit IU
Reproduction control information: PGCI (Program Chain Information)

(I) Embodiment of Information Record Medium

First of all, a physical structure and a logical structure as well as an operation of a DVD, as one embodiment of the information record medium to which the present invention is applied, will be explained with reference to FIGS. 1 and 2.

Figures 1, 1A:
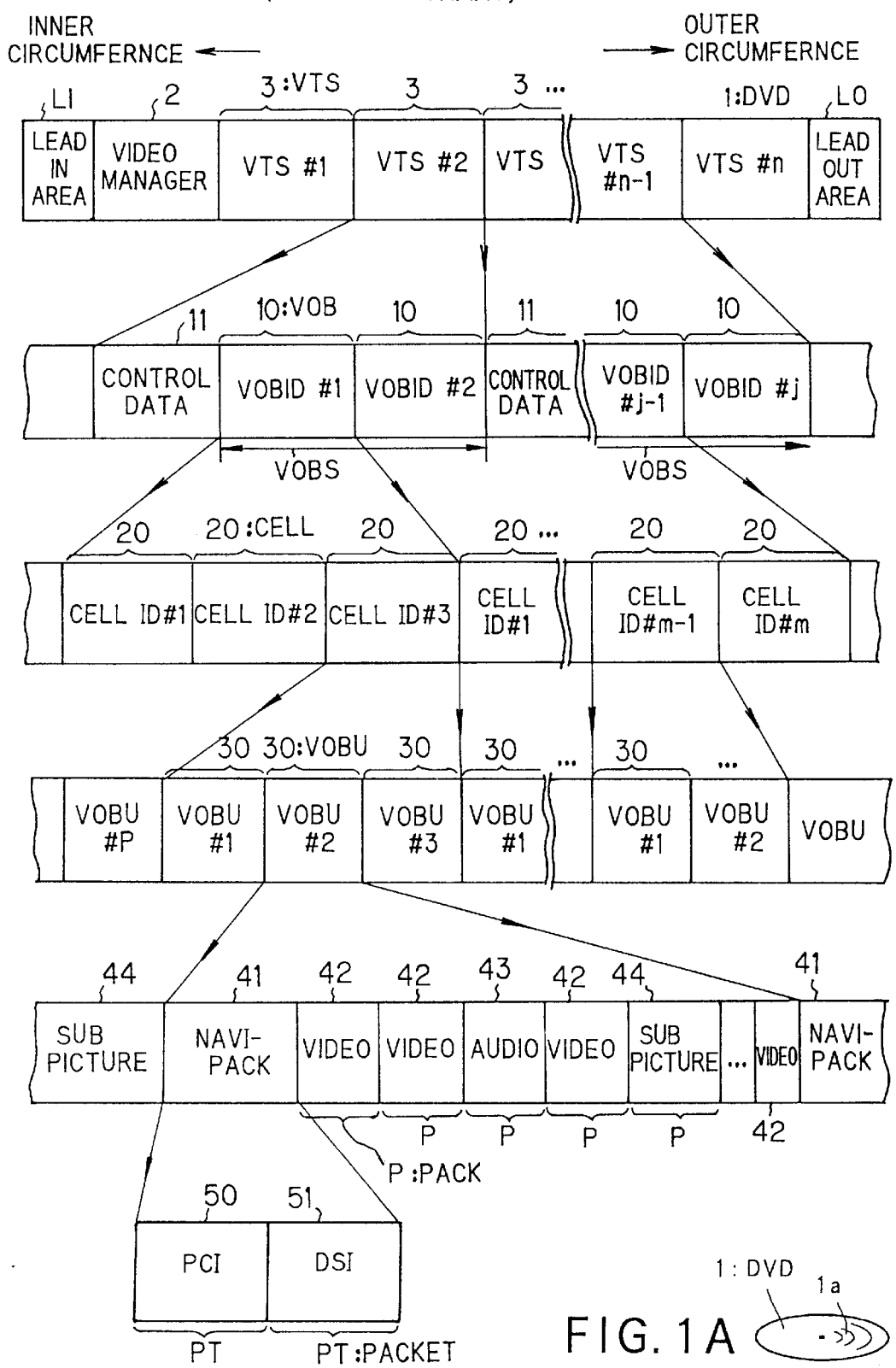
FIG. 1 FIG. 1A are a descriptive view of a recording format (a physical recording format) for recording video information and audio information on a DVD.
Figure 2:
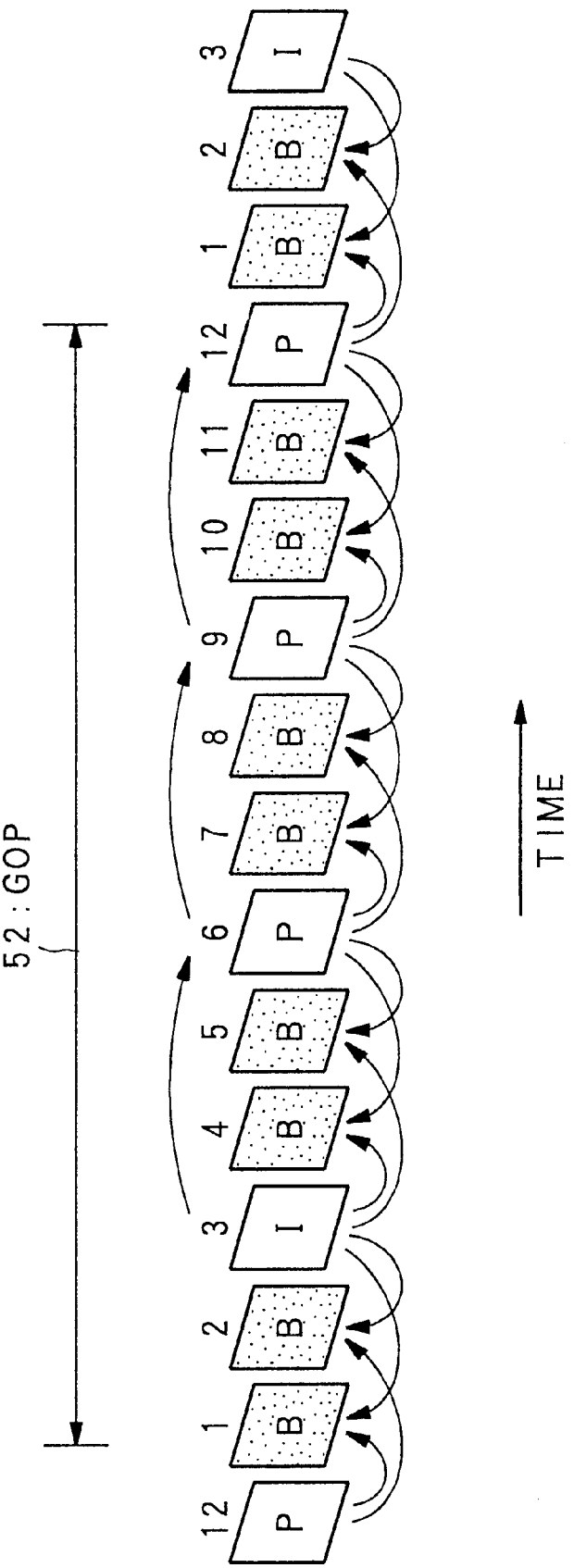
FIG. 2 shows examples of a plurality of frame pictures which construct one GOP 52.

At first, a record format of video information and audio information on the DVD (i.e. a physical record format) is explained by use of FIG. 1.

As shown in FIG. 1, a DVD 1 as the present embodiment is provided with a lead in area LI at its most inner circumferential portion and a lead out area LO at its most outer circumferential portion, between which video information and audio information are recorded such that they are divided into a plurality of VTSs 3, each of which has a unique ID (Identification) number (i.e. VTS#1 to VTS#n). Here, the VTS (Video Title Set) 3 is a set (bundle) of titles (each of which is one production or one work which an author or producer intends to offer to the audience), which are related to each other (e.g., which attribute, such as the number, the specification, the corresponding languages etc. of audio and video streams is the same to each other). More concretely, a plurality of movies which are related to the same movie to each other but which languages of serifs (lines) are different from each other may be recorded as different titles respectively, or even in case of the same movies, the theater version and the special version maybe recorded as different titles respectively. Ahead of the area where the VTSs 3 are recorded, a video manager 2 is recorded as shown in FIG. 1. As the information recorded in the video manager 2, for example, information related to the whole video and audio information recorded on the DVD 1, such as a menu showing names of the respective titles, information for preventing an illegal copy, an access table for accessing each title and so on, is recorded.

One VTS 3 is recorded such that it is divided into a plurality of VOBs 10, each of which has an ID number (VOB ID#1, VOB ID#2, . . . ), and control data 11 disposed ahead of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the cell will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1, cell ID#2, . . . ). Here, one VOB 10 is constructed such that it is completed by the plurality of cells 20 and that one cell 20 does not extend over two VOBs 10.

Next, one cell 20 is constructed of a plurality of VOB units (VOBUs) 30, each of which has an ID number (VOBU#1, VOBU#2, . . . ). Here, the VOB unit 30 is an information unit, each of which includes the video information, the audio information and sub picture information (which is defined as information of a sub picture such as a subtitle of a movie etc.).

One VOB unit 30 is provided with: a navi-pack (a navigation pack) 41; a video pack 42 having the video information; an audio pack 43 having the audio information; and a sub picture pack 44 having the sub picture information. Here, in the video pack 42, a packet including the video data is recorded. In the audio pack 43, a packet including the audio data is recorded. Further, in the sub picture pack 44, a packet including graphics such as a character and a diagram as the sub picture, is recorded. It is prescribed by a standard specification of the DVD that there are 8 kinds of audio recordable on the DVD 1 while 32 kinds of sub picture recordable on the DVD 1.

The recording is made so that the reproduction time for one VOB unit 30 (i.e., the reproduction time for the data recorded between one navi-pack 41 and another navi-pack adjacent thereto) is 0.4 second or longer. Further, the navi-pack 41 always exists at the forefront of one VOB unit. There may not exist each of the video pack 42, the audio pack 43 and the sub picture pack 44 therein, and even in case of their existence, the number of the packs and the order thereof are freely determined.

Finally, the navi-pack 41 is provided with: a DSI (Data Search Information) packet 51 including search information to search a video image or an audio sound desired to be displayed or sound-outputted (concretely, search information such as an address, where the video or audio to be displayed or sound-outputted is recorded, on the DVD 1); and a PCI (Presentation Control Information) packet 50 including information related to a display control at a time of displaying the video image or outputting the audio sound, which is searched on the basis of the information of the DSI packet 51. Further, all video data included in one VOBU 30 consist of at least one GOP (Group Of Pictures). In the PCI packet 50, high light information, which defines a display or operation at a time when one selection item is selected out of selection items by the audience, is included. By the high light information, for example, the change of the picture plane display as well as the display position to be changed with respect to the selection item selected on a special picture plane of selection items (i.e. a so-called menu picture plane) for the audience to select, and the command corresponding to the selected item (i.e. a command to be performed in correspondence with the selected item) are set.

The video information to construct and display a frame, a selection button and the like, which is required to construct and display the menu picture plane, is recorded in the sub picture pack 44 as the sub picture information.

Further, the above described GOP 52 is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

Here, the outline of the MPEG 2 method is explained. Namely, in general, frame pictures forward and backward of one frame picture in continuous frame pictures are often resembled to each other and have mutual relationships. The MPEG 2 method is a method, which is proposed by paying an attention to this fact, and which generates one frame picture existing between a plurality of frame pictures on the basis of the plurality of frame pictures transferred while they are timely separated by a few or several frames from each other, by means of an interpolating calculation based on moving vectors etc. of the original picture. In this case, if this one frame picture is to be recorded, it is enough to just record the information as for a differential vector and a moving vector thereof with respect to the plurality of frame pictures, so as to reproduce this one frame picture by estimating it from the plurality of frame pictures with referring to these vectors, at a time of reproduction. By this, the compression recording is enabled with respect to the picture.

Further, the scheme of the above explained GOP 52 is explained with reference to FIG. 2. FIG. 2 shows an example of a plurality of frame pictures constituting one GOP. In FIG. 2, a case where one GOP 52 consists of 12 frame pictures is illustrated (in the MPEG 2 method, the number of the frame pictures included in one GOP 52 is not fixed), for example. Among those frame pictures, a frame picture indicated by a reference sign I is called as an I picture (Intra-coded picture), which is defined as a frame picture able to be reproduced as a complete frame picture by use of its own video information. A frame picture indicated by a reference sign P is called as a P picture (Predictive-coded picture), which is defined as a frame picture predicted or generated by decoding a difference from a predictive picture compensated and reproduced on the basis of the already decoded I picture or other picture. A frame picture indicated by a reference sign B is called as a B picture (Bidirectionally Predictive-coded picture), which is defined as a frame picture predicted or reproduced by use of not only the already decoded I picture or P picture but also the I picture or P picture which is recorded on the optical disk timely in the future relative to the pertinent B picture. In FIG. 2, the relationship in the prediction (i.e. the relationship in the compensation) between the respective pictures are indicated by arrows.

The MPEG 2 method used in the DVD 1 of the present embodiment employs a variable rate method, in which the data amount included in each GOP is not constant. Namely, in case that the respective pictures included in one GOP 52 correspond to a moving picture, which moving speed is rather fast and that the mutual relationship between the respective pictures is relatively small, the data amount constituting the respective pictures is increased, so that the data amount included in one GOP 52 is also increased. On the other hand, in case that the respective pictures included in one GOP 52 correspond to a moving picture which moving speed is rather slow and that the mutual relationship between the respective pictures is relatively large, the data amount constituting the respective pictures is decreased, so that the data amount included in one GOP 52 is also decreased.

In the above explained record format having a hierarchical structure as shown in FIG. 1, each division can be freely set according to the authors intention, so as to perform recording on the basis of these set divisions. By performing the reproduction on the basis of a later described logical structure for each of these divisions, the variegated reproduction can be performed.

Next, a logical format (logical structure) constructed by combining the information recorded by the physical divisions shown in FIG. 1 is explained with reference to FIG. 3. The information is not actually recorded on the DVD 1 in the logical structure of FIG. 3. Instead, information (e.g. access information or time information) to reproduce each data shown in FIG. 1 by combining them (especially combining the cells 20) in the logical structure shown in FIG. 3, is recorded on the DVD 1 , especially in the control data 11.

Figure 3:
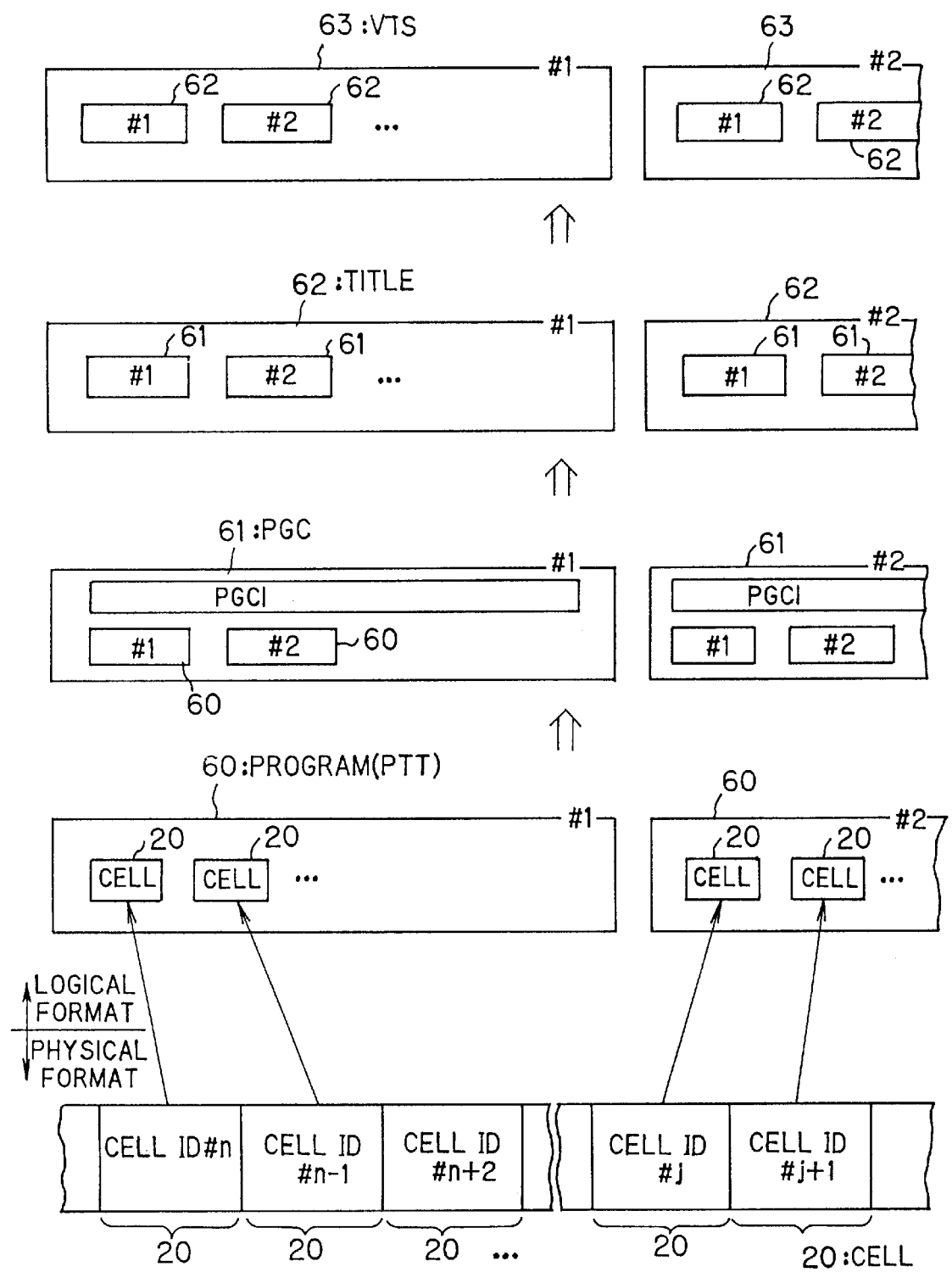
FIG. 3 shows a logical format (a logical structure) in combination with the information recorded on the basis of the physical sections as shown in FIG. 1.

To make the explanation clear, the following explanation is made from the lower hierarchical layer in FIG. 3. One program 60 is logically constructed on the basis of the authors intention by selecting and combining a plurality of cells 20 among the physical structures explained by use of FIG. 1. The program 60 is also a minimum logical unit, which division can be identified by a system controller of a reproducing apparatus described later and which can be accessed by use of a command by the system controller. It is also possible for the author to define a gathering of one or more programs 60 as a minimum unit, which can be freely selected to be watched or listened to by the audience and which is referred to as a PTT (Part Of Title).

Since one program 60 is logically constructed by selecting a plurality of cells 20, it is possible to use one cell commonly for a plurality of programs 60, namely to perform a so-called alternative usage of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID# in FIG. 1). On the other hand, at a time of treating the cell 20 on the logical format shown in FIG. 3, the number is treated as the cell number in the order of description in the PGCI described later.

Next, by combining a plurality of programs 60, one PGC (Program Chain) 61 is logically constructed on the basis of the authors intention. The aforementioned PGCI (ProGram Chain Information) is defined by a unit of the PGC 61. The PGCI includes information indicating: the reproduction order for each program 60 at a time of reproducing each program 60 (by this reproduction order, a unique program number (#1,#2, . . . ) is assigned to each program 60); the reproduction order for each cell 20 (by this reproduction order, a unique cell number is assigned to each cell 20); an address which is a record position of each cell 20 on the DVD 1 ; the number of the cell 20 positioned at the head of one program 60 to be firstly reproduced; a reproduction method for each program 60 [it is possible for the author to select one reproduction method out of (i) a random reproduction (which is a random reproduction by use of random numbers, and the same program 60 may be reproduced by a plurality of times), (ii) a shuffle reproduction (which is a random reproduction by use of random numbers in the same manner as the random reproduction, but one program 60 is reproduced just once but not reproduced by a plurality of times), (iii) a loop reproduction (which is a reproduction to reproduce one PGC 61 repeatedly), and (iv) a combination of the loop reproduction with the random reproduction or the shuffle reproduction, as a reproduction method to be employed at a time of reproduction]; and various commands (e.g. commands able to be specified by the author for each PGC 61 or each cell 20). The recording position of the PGCI on the DVD 1 may be in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously arranged, for example, the method of reproducing the cell 20 prior which is recorded posterior on the record track) other than a method of reproducing the cell 20 in the recording order on the record track on the DVD 1 as it is (i.e. the method of reproducing the cells continuously arranged).

Then, one title 62 is logically constructed of one or a plurality of PGCs 61. The title 62 is, for example, a unit corresponding to one movie, and is completed information which the author would like to offer to the audience of the DVD 1.

Finally, one VTS 63 is logically constructed of one or a plurality of titles 62. The title 62 included in the VTS 63 has the attributes common to each other. For example, the movies based on one movie but in different languages correspond to the respective titles 62. The information included in one VTS 63 shown in FIG. 3 corresponds to information included in one VTS 3 shown in FIG. 1. Namely, all information included in the logical VTS 63 shown in FIG. 3 is recorded as one VTS 3 in the DVD 1.

As the author specifies the information divided in the physical structure on the DVD 1 on the basis of the above described logical format, the video image (e.g. the movie image) for the audience to watch is to be formed.

In the explanations for the physical structure shown in FIG. 1, for the easy understanding of the content, it has been explained such that a plurality of cells 20 are recorded in the order of the ID numbers. However, in the DVD 1 of the present embodiment, one cell 20 may be divided into a plurality of interleaved units IU to be actually recorded on the DVD 1, as shown in FIG. 4.

Figure 4:
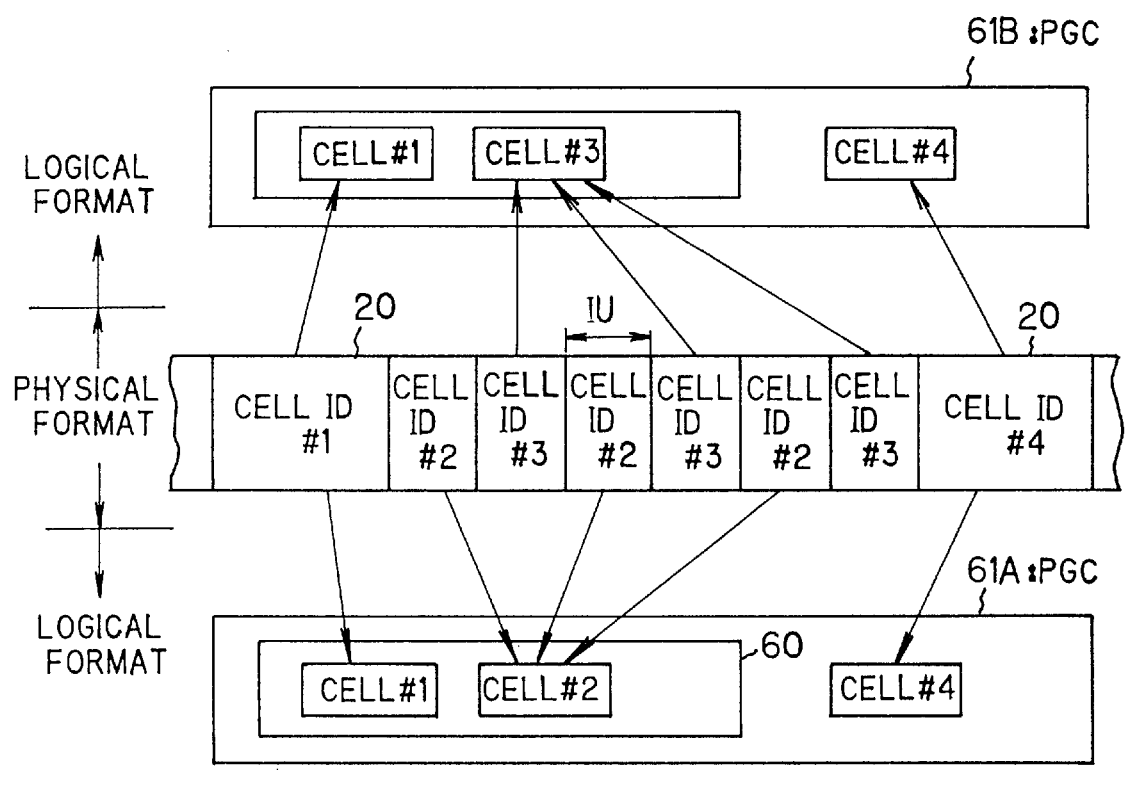
FIG. 4 is a descriptive view in case that one cell 20 is separately recorded on a plurality of interleaved units IU.

Namely, as shown in FIG. 4, it is assumed that the author constructs one PGC 61A of the cells 20 having the ID numbers 1, 2 and 4, and constructs another PGC 61B of the cells 20 having the ID numbers 1, 3 and 4. In this case, at a time of reproducing the information from the DVD 1 on the basis of the PGC 61A, only the cells having the ID numbers 1, 2 and 4 are reproduced, while, at a time of reproducing the information from the DVD 1 on the basis of the PGC 61B, only the cells 20 having the ID numbers 1, 3 and 4 are reproduced. In the case of the PGC 61A for example, if the cells 20 are recorded spaced from each other for each ID number, a certain time period to jump the optical pickup from the record position of the cell 20 having the ID number 2 on the DVD 1 to the record position of the cell 20 having the ID number 4 on the DVD 1 is required in the reproduction. This results in that the continuous reproduction (hereinafter, it is referred to as a seamless reproduction) of the cell 20 having the ID number 2 and the cell 20 having the ID number 4 may not be possible depending on a capacity of a track buffer of the reproducing apparatus described later.

Therefore, in the case shown in FIG. 4, the cell 20 having the ID number 2 and the cell having the ID number 3 are divided into interleaved units IU and are recorded by the interleaved units IU, each having a length, which does not destroy the continuity of an output signal of the track buffer even if an input signal to the track buffer is temporarily stopped, in correspondence with an input and output processing speeds at the track buffer (i.e. the interleaved units IU, each having a length which allows the track buffer to continuously output the output signal even if the input signal to the track buffer is ceased while the optical pickup jumps for the interval of one interleaved unit IU). For example, in case of reproduction based on the PGC 61A, only the interleaved units IU constructing the cell 20 corresponding to the ID number 2 are continuously detected to be reproduced. In the same manner, in case of reproduction based on the PGC 61B, only the interleaved units IU constructing the cell 20 corresponding to the ID number 3 are continuously detected to be reproduced. The length of the interleaved unit IU may be determined with considering the capability of a driving mechanism such as a slider motor to perform the track jump, in addition to the memory capacity of the track buffer.

In this manner, by dividing one cell 20 into a plurality of interleaved units IU and recording them according to the authors intention, the signal outputted from the track buffer can be continuous even at a time of reproducing the PGC 61 including the cells 20 having the discontinuous ID numbers, so that it is possible for the audience to watch continuous reproduction video image.

Each interleaved unit IU is completed in one VOB 10, and does not extend over two adjacent VOBs 10. As for the relationship between the interleaved unit IU and the VOB unit 30, one or a plurality of VOB units 30 are included in one interleaved unit IU. One VOB unit 30 is completed in one interleaved unit IU, and is not divided into a plurality of interleaved units IU or does not extend over a plurality of interleaved units IU.

In general, the DVD has functions of angle control and parental control. The angle control means a function of selecting, at a user's discretion, any one of pictures taken at different camera angles.

In its structural description, one PGC is divided into a plurality of blocks as cells, and these cells have the respective angle numbers as defined. A player reproduces the cell having the angle number which is designated by the user. The parental control means a controlling system of considering the existence of portions of a plurality of stories, which are wished to be kept in secret by parents, so as to conduct an automatic selection and reproduction of the stories. The player has the parental level which is reproducible by itself (which is changeable by the user), and selects the PGC having the ID number which is identical with this level, so as to carry out the reproduction.

The above-mentioned functions of the angle control and the parental control permit the recording of the simultaneously advancing multi-stories in a single disk.

Figure 5:
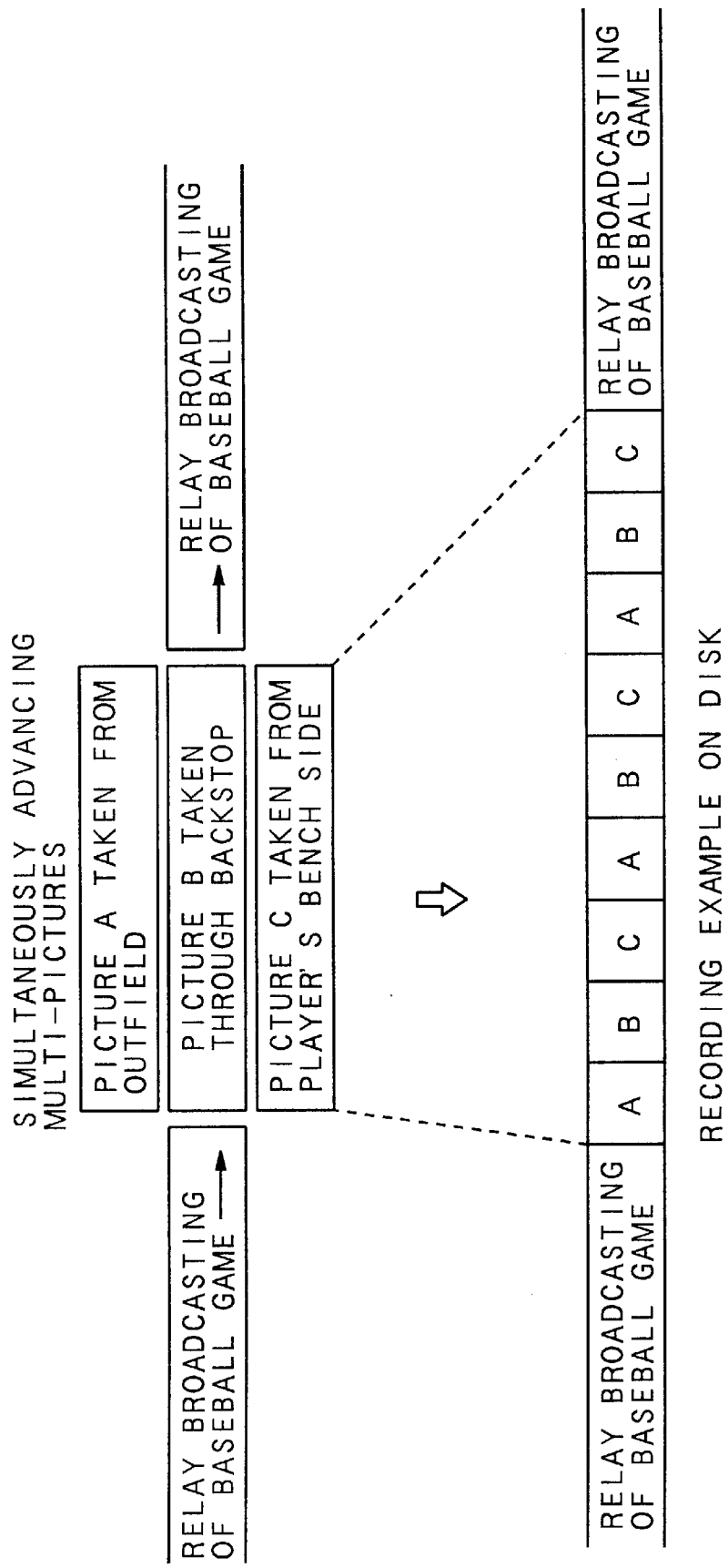
FIG. 5 shows an example of an interleave structure for achieving reproduction of video information at different camera angles.

FIG. 5 shows an example of an interleave structure for achievement of the angle control function.

In FIG. 5, there is shown an example of a relay broadcasting of a baseball game. In this example, there are recorded on a disk a picture "A" taken from the outfield, a picture "B" taken through the backstop and a picture "C" taken from the player's bench side, as multi-picture. The respective pictures "A", "B" and "C" are hereinafter referred to as the "video objects".

Figure 6:
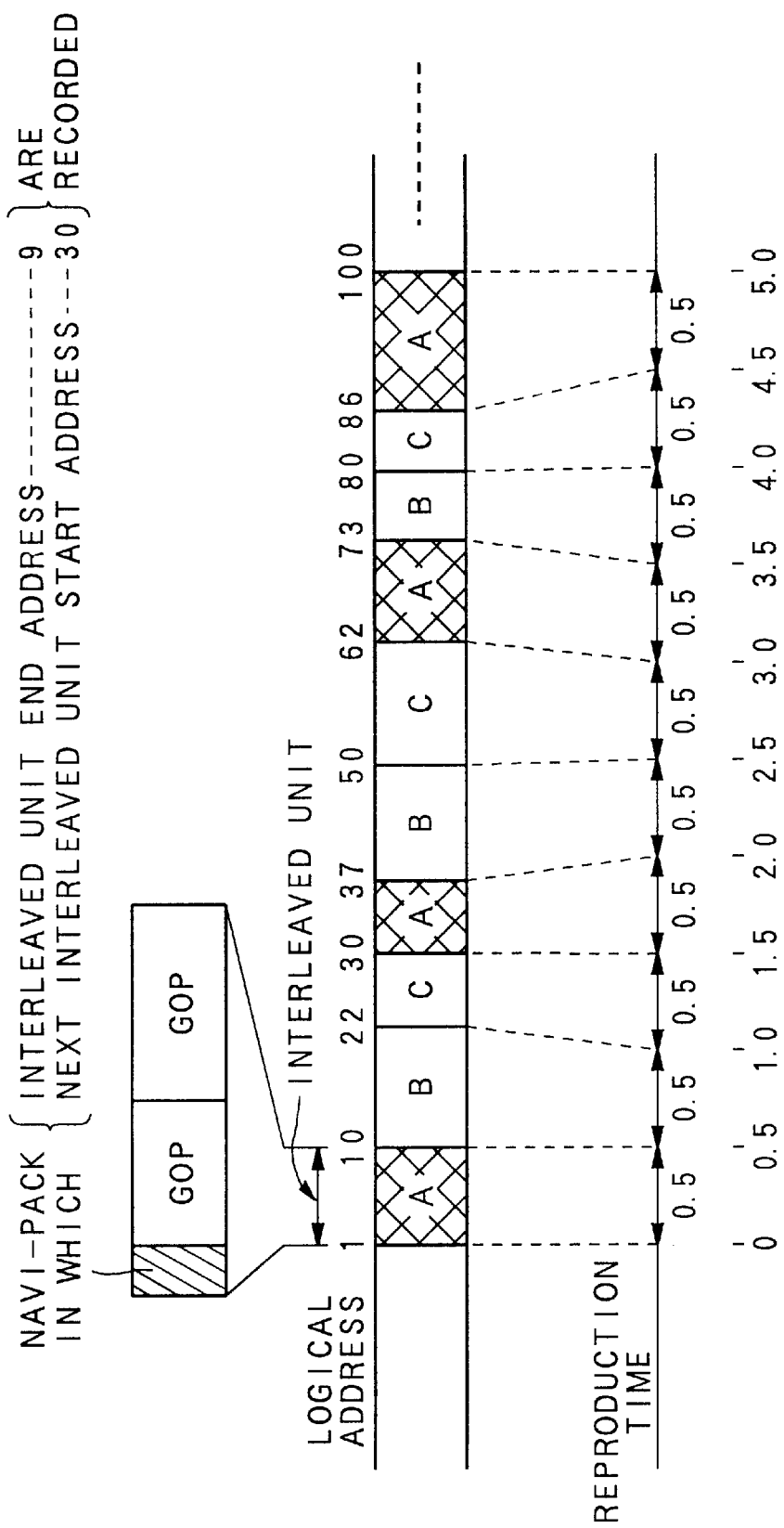
FIG. 6 is a further detailed descriptive view of the interleave structure as shown in FIG. 5.

FIG. 6 is a further detailed descriptive view of the interleave structure as shown in FIG. 5. It is assumed, for the purpose of simplification of explanation, that the reproduction times in all the interleaved units are constant (i.e., 0.5 second), and the single interleaved unit is constituted by the single video object unit. As shown in FIG. 6, each of the interleaved units has a navi-pack, and in this navi-pack, there are recorded an end address of the interleaved unit and a start address of the other interleaved unit to be read out next.

Figure 7:
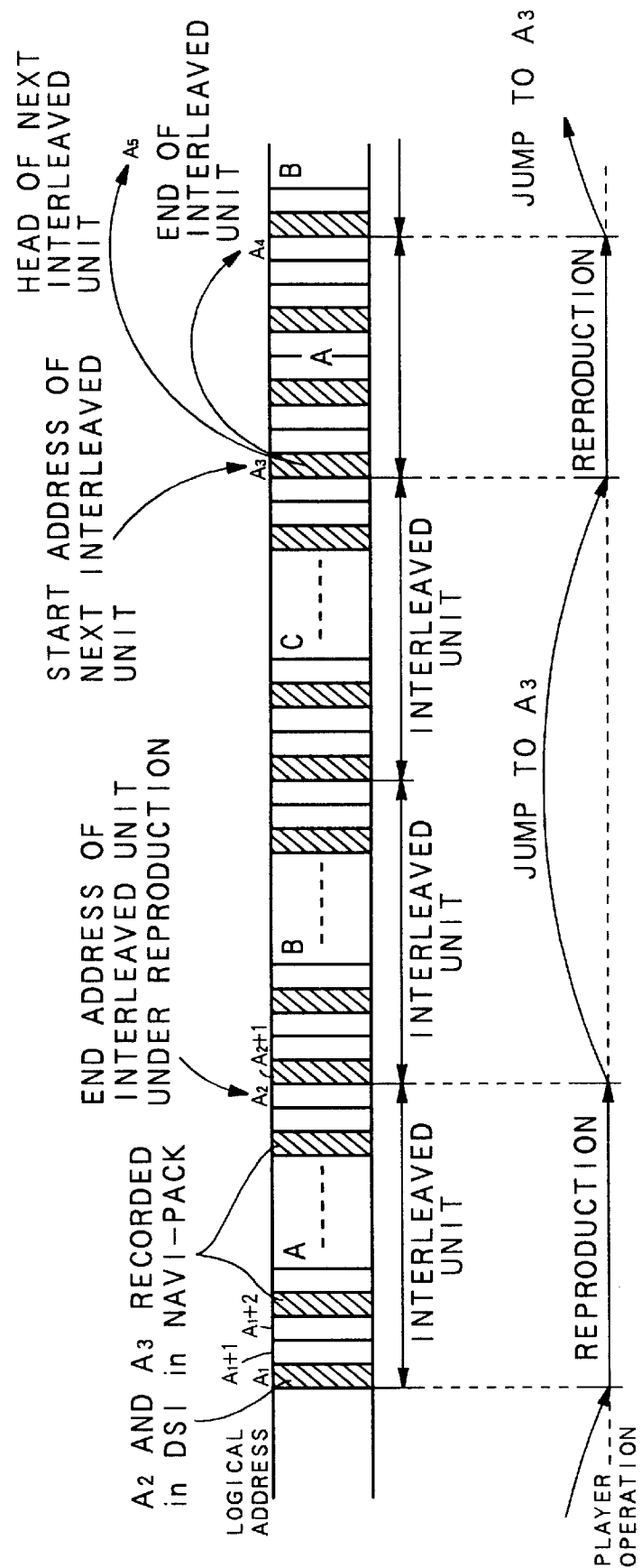
FIG. 7 is a descriptive view of reading-out order of data in a normal reproduction operation.

FIG. 7 is a descriptive view of reading-out order of data in a normal reproduction operation. On the assumption that a user has selected the picture "A" described with reference to FIG. 5, the start address A1 is read out first from a Cell Playback Information Table (C_PBIT) of the PGCI in the PGI. Then, there is read out the navi-pack which is recorded in a logical address A1 on the basis of the above-mentioned start address A1. At this time, there are temporarily stored the end address A2 of the interleaved unit and the start address A3 of the next interleaved unit recorded in the navi-pack. When the reproduction of A2 is completed, the track jump up to the logical address A3 is performed, and the navi-pack recorded therein is read out. A normal reproduction operation is carried out on the basis of the end address A4 of the interleaved unit and the start address A5 of the next interleaved unit recorded in the navi-pack which is recorded at the address A3. Further detailed explanation thereof will be given in a description of operation of the reproduction apparatus.

Then, a detailed description will be given of video information and audio information which have the above-described physical and logical structures, and especially, Video Object Identification Information (VOB_ID, VOB_ID') of the present invention. When the navi-pack cannot be read out or a reading-out error occurs for some reason or other in the normal reproduction operation, subsequent reproduction cannot be achieved, as described above.

Accordingly, in the information record medium of the present invention, (1) there is recorded, in the reproduction control information (PGCI), Video Object Identification Information (VOB_ID) indicating not only a reproduction start address of the cell constructing the video object to be selected by a user, but also to which VOB data the above-mentioned cell belongs (e.g., the picture A when it has been selected by a user in the example as shown in FIG. 5), and (2) a navi-pack is provided in real time data, and there is provided, in the above-mentioned navi-pack, Video Object Identification Information (VOB_ID') for identifying the VOB to which data subsequent to the above-mentioned navi-pack belong.

According to the above-described construction, even when the navi-pack cannot be read out or a reading-out error occurs for some reason or other in the reproduction apparatus, it is possible to continue the reproduction of the interleaved unit by searching the Video Object Identification Information (VOB_ID') in the navi-pack included in the real time data, which is identical with the Video Object Identification Information (VOB_ID) recorded in the reproduction control information (PGCI).

FIG. 8 shows an example of a data structure of the PCGI. In this example, there is recorded, in a Cell Position Information Table (C_POSIT), the Video Object Identification Information (VOB_ID) indicating to which data (VOB) the cell belongs, which constructs the video object to be selected by a user.

Figure 9:
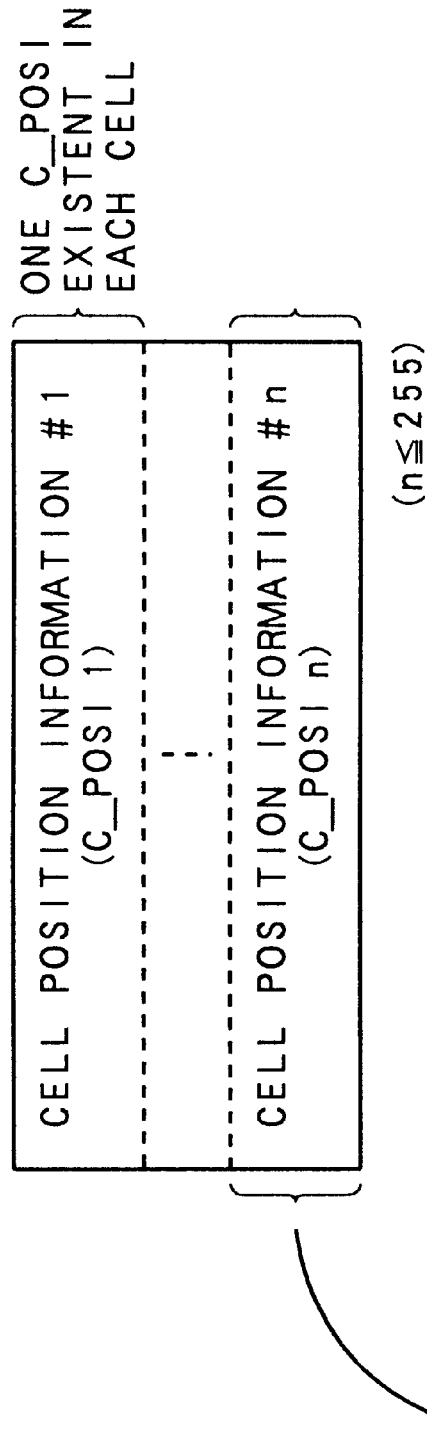
FIG. 9 shows an example of a cell-positioning-information table (C_POSIT)

FIG. 9 shows an example of the Cell Position Information Table (C_POSIT). Here, the Cell Position Information Table has description of the VOB_ID number and the cell identification number of the cell used in the PGC. A single cell position information exists for each cell. An example of the cell position information is illustrated in a table C_POSIT.

FIG. 10 shows data search information in real time data. In this example, the Video Object Identification Information (VOB_ID') is recorded as a BOBU_VOB_IDN in the item (7) of FIG. 10.

The above-mentioned DVD has storage capacity which permits the recording not only of, for example, a single movie, but also of movies of different versions corresponding to the above-mentioned single movie in the same optical disk. It is therefore effective to apply the above-described record format especially to the DVD 1.

(II) Embodiment of Recording Apparatus

Next, an embodiment of a recording apparatus for recording the above-mentioned control information, video information and audio information onto the DVD 1 will be explained with reference to FIG. 11.

At first, a construction and an operation of the recording apparatus as the embodiment is explained with reference to FIG. 11.

Figure 11:
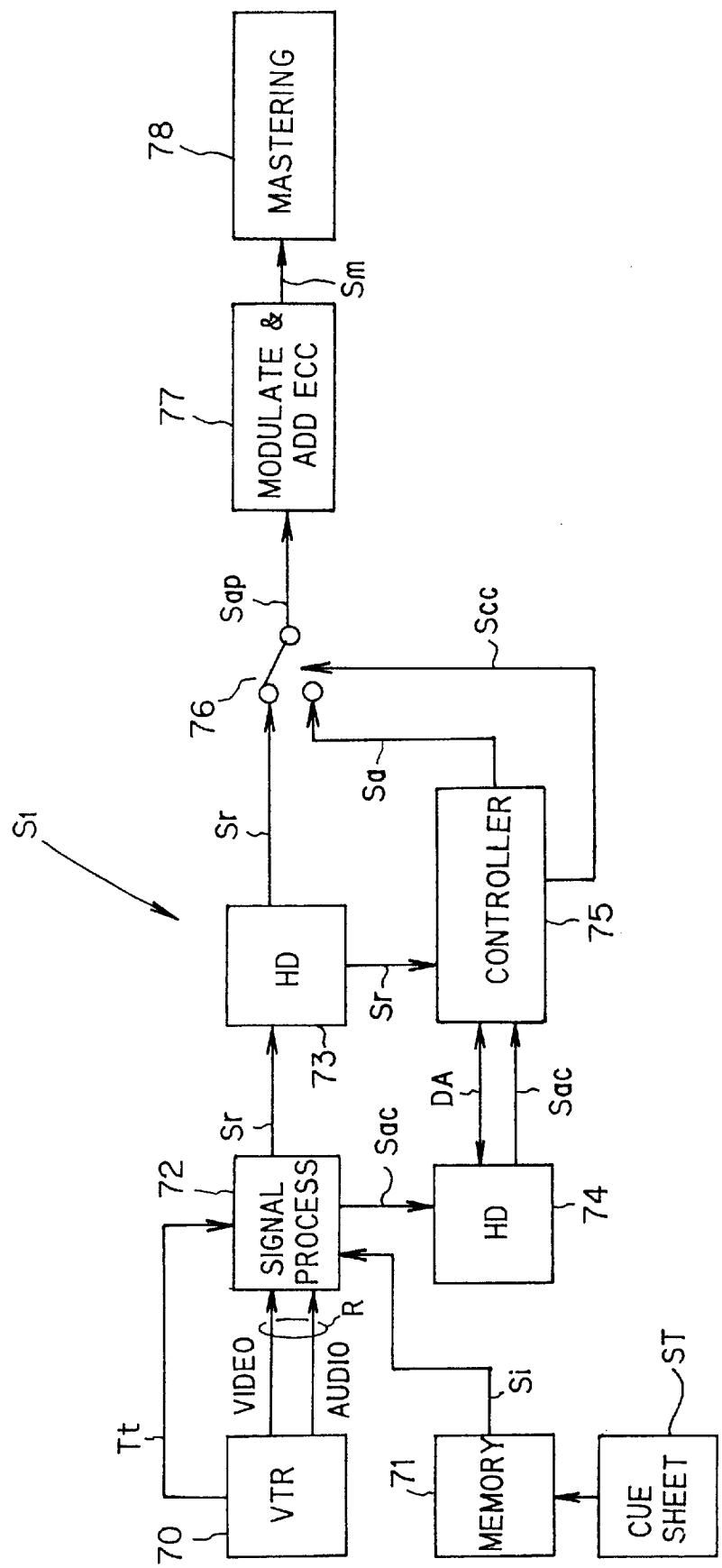
FIG. 11 is a block diagram illustrating a construction of the information recording apparatus for recording control information, video information and audio information on a DVD 1.

As shown in FIG. 11, the recording apparatus S1 as the present embodiment is provided with: a VTR (Video Tape Recorder) 70; a memory 71; a signal process unit 72; a hard disk (HD) device 73; a hard disk (HD) device 74; a controller 75; a multiplexer 76; a modulator 77; and a mastering device 78.

Next, an operation of the present embodiment is explained.

Record information R, which is a raw material such as audio information, video information, etc. to be recorded on the DVD 1 , is temporarily recorded in the VTR 70. Then, the record information R temporarily recorded in the VTR 70 is outputted to the signal process unit 72 by a request from the signal process unit 72.

The signal process unit 72 applies an A/D (Analog to Digital)converting process and a signal compressing process on the basis of the MPEG 2 method to the record information R outputted from the VTR 70, and time-axis-multiplexes the audio information and the video information to output it as a compressed multiplexed signal Sr. After that, the compressed multiplexed signal Sr outputted therefrom is temporarily stored into the hard disk device 73.

Along with this, the memory 71 classifies the record information R into a plurality of partial record information Pr in advance, and temporarily stores content information related to the partial record information Pr which is inputted beforehand on the basis of a cue sheet ST, on which the Video Object Identification Information (VOB_ID,VOB_ID') related to the respective partial record information Pr are written. Then, the memory 71 outputs it as a content information signal Si on the basis of a request from the signal process unit 72.

Then, the signal process unit 72 generates and outputs an access information signal Sac corresponding to the partial record information Pr with reference to a time code Tt corresponding to the record information R outputted from the VTR 70, on the basis of the time code Tt and the content information signal Si outputted from the memory 71. Then, the access information signal Sac is temporarily stored in the hard disk device 74. The above described processes are performed with respect to the whole record information R.

When the above described processes are finished as for the whole record information R, the controller 75 reads out the compressed multiplexed signal Sr from the hard disk device 73, reads out the access information signal Sac from the hard disk device 74, generates additional information DA on the basis of these read out signals, and stores the additional information DA into the hard disk device 74. This is because there may be a control signal, whose content is determined independence upon a generation result of the compressed multiplexed signal Sr among various control signals. On the other hand, the controller 75 performs a time management for each of the operations of the signal process unit 72, the hard disk device 73 and the hard disk device 74, and reads out the additional information DA from the hard disk device 74, so that the controller 75 generates and outputs an additional information signal Sa corresponding to the read out additional information DA, and generates and outputs an information selection signal Scc to time-axis-multiplex the compressed multiplexed signal Sr and the additional information signal Sa.

After that, the compressed multiplexed signal Sr and the additional information signal Sa are time-axis-multiplexed by the multiplexer 76 on the basis of the information selection signal Scc, to be outputted as an information-added compressed multiplexed Sap.

Then, the modulator 77 adds an error correction code (ECC), such as a Reed Solomon code, and applies a modulation such as an eight to sixteen (8–16) modulation with respect to the information-added compressed multiplexed signal Sap outputted from the multiplexer 76, and generates and outputs a disk record signal Sm to the mastering device 78.

Finally, the mastering device 78 records the disk record signal Sm on a stamper disk, which becomes a master (i.e. a cutting dye) for the production of an optical disk. Then, by use of this stamper disk, an optical disk as a replica disk, which can be on sale in the general market, i.e. the DVD 1, can be produced by a replication device not illustrated.

Now, description will be given of recording operation of the Video Object Identification Information (VOB_ID, VOB_ID') based on the additional information DA, by means of the recording apparatus S1 as the feature of the embodiment of the present invention.

First, the information selection signal Scc indicating that the additional information signal Sa should be selected, is outputted by the controller 75 at a timing according to the access information signal Sac generated on the basis of the content information signal Si for designating the Video Object Identification Information (VOB_ID,VOB_ID') inputted through the cue sheet ST, and the switching operation to the side of the additional information signal Sa is made in the multiplexer 76. The Video Object Identification Information (VOB_ID) is inputted into the modulator 77 as a part of the additional information signal Sa which constructs the Cell Position Information Table in the PGCI, and further inputted into the mastering device 78 as a part of the disk record signal Sm. Then, there is inputted in the same manner into the modulator 77 as a part of the disk record signal Sm, the DSI data including the Video Object Identification Information (VOB_ID') which constructs the navi-pack 41 of the first VOBU constructing the first VOB as shown in FIG. 1. Then, the information selection signal Scc indicating that the additional information signal Sa should be selected, is outputted by the controller 75, the switching operation to the side of the compressed multiplexed signal Sr is made in the multiplexer 76, and the video data, the audio data and the sub picture data in the VOBU are successively inputted into the modulator 77 as the information-added compressed multiplexed signal Sap. The above-mentioned operation is repeated for a plurality of VOBUs and a plurality of VTSs.

According to the embodiment of the present invention, as described above, it is possible to produce a master disk in which the Video Object Identification Information (VOB_ID) is recorded in the reproduction control information (PGCI) and the Video Object Identification Information (VOB_ID') is recorded in the navi-pack included in the real time data.

The Video Object Identification Information (VOB_ID, VOB_ID') can be recorded by means of the information recording apparatus S1 in the same formats as the example of the data structure of the PCGI (FIG. 8), the example of the Cell Position Information Table (FIG. 9) and the example of the table of the data search information in the real time data (FIG. 10), which are set forth in the description of the embodiment of the information record medium of the present invention.

The other control information is recorded from the cue sheet ST in the same manner.

(III) Embodiment of Reproducing Apparatus

Now, an embodiment of a reproducing apparatus for reproducing the information recorded on the DVD 1 by the above-mentioned recording apparatus will be explained with reference to FIGS. 12 and 13. In the following description, the selecting means set forth in the claim corresponds to an input unit 98 and a system controller 100, the first information read out means and the second information read out means set forth therein correspond to an optical pickup 80, and the judging means set forth therein corresponds to the system controller 100. In FIG. 13, the first information read out means functions in the step S10, the second information read out means does in the step S16, and the judging means does in the step S18.

At first, a construction and an operation of the reproducing apparatus as the embodiment is explained with reference to FIG. 12.

Figure 12:
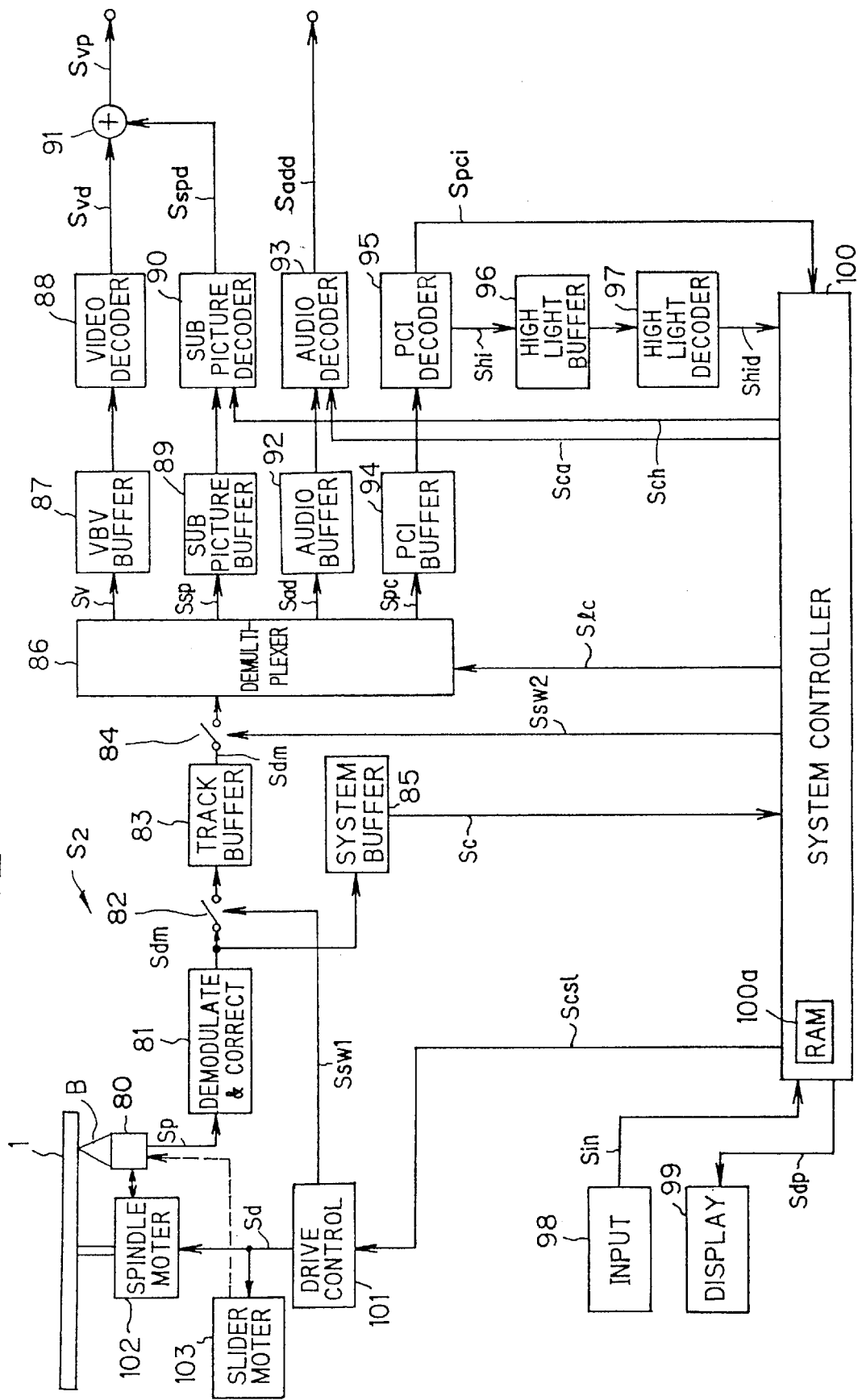
FIG. 12 is a block diagram illustrating a construction of the information reproduction apparatus for reproducing information which has been recorded on the DVD 1 by means of the information recording apparatus S1.
Figure 13:
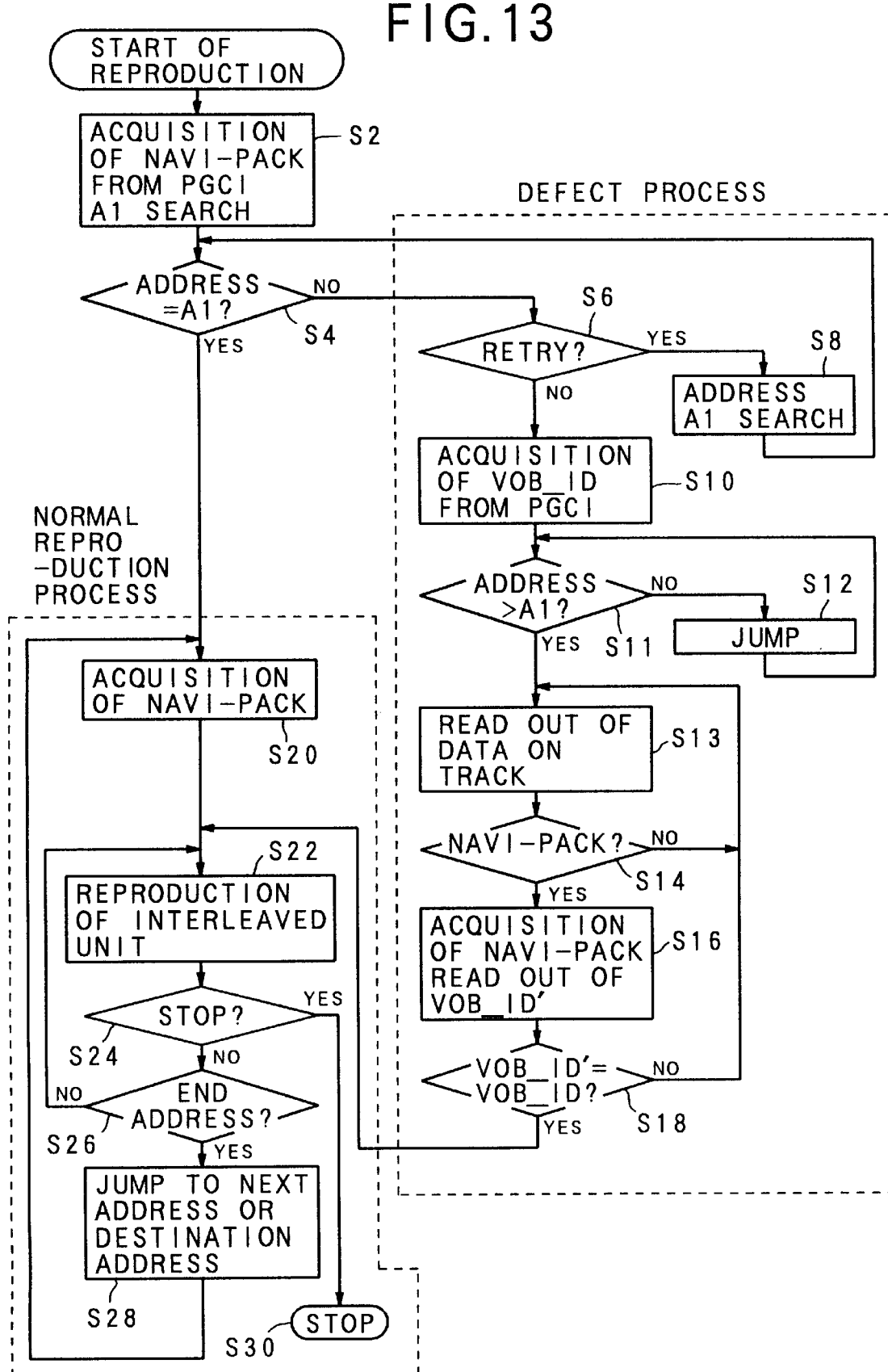
FIG. 13 is a flowchart illustrating a normal reproduction operation of the DVD 1, and a defect process to be carried out with the use of a video-object identification information (VOB_ID).

As shown in FIG. 12, a reproducing apparatus S2 as the present embodiment is provided with: a pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; a PCI (Presentation Control Information) buffer 94; a PCI decoder 95; a high light buffer 96; a high light decoder 97; an input unit 98; a display unit 99; a system controller 100; a drive controller 101; a spindle motor 102; and a slider motor 103. The construction shown in FIG. 12 only illustrates the portions related to the video and audio reproduction of the reproducing apparatus S2. The description and the detailed explanation as for servo circuits to servo-control the optical pickup 80, the spindle motor 102, the slider motor 103 and the like are omitted since they are constructed in the same manner as the conventional arts.

Next, an overall operation of the present embodiment is explained.

The optical pickup 80 includes a laser diode, a polarization beam splitter, an objective lens, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. When it is closed, the stream switch 82 passes therethrough the inputted demodulation signal Sdm as it is, to output it to the track buffer 83. When it is opened, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is closed. The track buffer 83 compensates a difference or fluctuation in the data amount between respective GOP under the MEPG 2 method, and continuously outputs the demodulation signal Sdm, which is discontinuously inputted due to a track jump in the aforementioned seamless reproduction, in case of reading the data divided into the interleaved units IU, so as to avoid the interruption of the reproduction due to the discontinuity.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the video manager 2, the control data 11 of the VTS 3 and the like which are detected firstly upon loading the DVD 1 and which are related to the whole information recorded on the DVD 1. Then, the system buffer 85 outputs the accumulated data as control information Sc to the system controller 100, and temporarily stores information included in the DSI packet 51 for each navi-pack 41 (refer to FIG. 1) as the occasion demands while reproducing the information, to output it also as the control information Sc to the system controller 100.

The demultiplexer 86, to which the demodulation signal Sdm is continuously inputted through the stream switch 84, separates the video information, the audio information, the sub picture information and the PCI packet 50 for each navi-pack 41 respectively from the inputted demodulation signal Sdm, and outputs them as a video signal Sv, a sub picture signal Ssp, an audio signal Sad and a PCI signal Spc respectively to the VBV buffer 87, the sub picture buffer 89, the audio buffer 92 and the PCI buffer 94. There may be a case where, in the demodulation signal Sdm, different streams of the audio information or the sub picture information in a plurality of different languages are included as the audio or sub picture information. In that case, a desirable language is selected for the audio or sub picture information by a stream selection signal Slc from the system controller 100, so that the audio or sub picture information in the desirable language is outputted to the audio buffer 92 or the sub picture buffer 89.

The VBV buffer 87, to which the video signal Sv is inputted, consists of a FIFO memory, for example. The VBV buffer 87 temporarily stores the video signal Sv and outputs it to the video decoder 88. The VBV buffer 87 compensates the difference or fluctuation in the data amount between respective pictures of the video signal Sv compressed by the MPEG 2 method (refer to FIG. 2). Then, the video signal Sv in which the differences in the data amount are compensated, is outputted to the video decoder 88, and is decoded by the MPEG 2 method to be outputted as a decoded video signal Svd to the mixer 91.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture information included in the sub picture signal Ssp with the video information corresponding to the sub picture information, and to output it. Then, the sub picture signal Ssp synchronized with the video information is inputted to the sub picture decoder 90 and is decoded to be outputted as a decoded sub picture signal Sspd to the mixer 91.

In a case where the sub picture signal Ssp includes video information to construct a frame, a selection button, etc. for displaying the menu picture plane, the sub picture decoder 90 changes a display condition of the selection button, etc. to be displayed, in the sub picture signal Sspd on the basis of a high light control signal Sch from the system controller 100 to output it.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, to output it, and delays the audio signal Sad in accordance with the output condition of the corresponding video information. Then, the audio signal Sad, which is time-adjusted to synchronize with the corresponding video information, is outputted to the audio decoder 93. Then, a predetermined decoding process is applied thereat to the audio signal Sad, and it is outputted as a decoded audio signal Sadd to a speaker, etc. not illustrated. If it is detected by the system controller 100 that it is necessary to temporarily stop (pause) the audio voice in the reproduction immediately after accessing, a pause signal Sca is outputted from the system controller 100 to the audio decoder 93, so that the output of the decoded audio signal Sadd is stopped temporarily at the audio decoder 93.

The PCI buffer 94, to which the PCI signal Spc is inputted, consists of a FIFO memory, for example. The PCI buffer 94 temporarily stores the inputted PCI signal Spc and outputs it to the PCI decoder 95. The PCI buffer 94 is to synchronize the PCI packet 50, which is included in the PCI signal Spc, with the video information, the audio information and the sub picture information corresponding to the PCI packet 50, and apply the PCI packet 50 to the video information and the like. Then, from the PCI signal Spc, which is synchronized with the corresponding the video information and the like by the PCI buffer 94, a high light information included in the PCI packet 50 is separated or extracted by the PCI decoder 95, and is outputted as a high light signal Shi to the high light buffer 96. The portion of the PCI packet 50 other than the high light information is outputted as a PCI information signal Spci to the system controller 100.

The high light buffer 96, to which the high light signal Shi is inputted, consists of a FIFO memory, for example. The high light buffer 96 temporarily stores the inputted high light signal Shi and outputs it to the high light decoder 97. The high light buffer 96 is to time-compensate the high light signal Shi so as to precisely perform a change in the display condition of the selection item, which corresponds to the high light information, in correspondence with the sub picture signal Ssp in which the video information for the high light information is included. Then, the time-compensated high light signal Shi is decoded by the high light decoder 97, and the information included in the high light signal Shi is outputted as a decoded high light signal Shid to the system controller 100. Here, the system controller 100 outputs the aforementioned high light control signal Sch to change the display condition by the high light information, on the basis of the decoded high light signal Shid.

On the basis of the control information Sc inputted from the system buffer 85, the PCI information signal Spci inputted from the PCI decoder 95 and an input signal Sin inputted from the input unit 98 such as a remote controller, the system controller 100 outputs the aforementioned switch signal Ssw2, the stream selection signal Slc, the pause signal Sca and the high light control signal Sch to correctly perform the reproduction corresponding to those input signals, and also outputs a display signal Sdp to display an operation condition, etc. of the reproducing apparatus S2 to the display unit 99 such as the liquid crystal device.

Further, the system controller 100 outputs a seamless control signal Scsl corresponding to the track jump process, to the drive controller 101, when it detects by the control signal Sc, the aforementioned DSI data, etc. that it is necessary to perform the track jump process such as a search in order to perform the seamless reproduction.

Then, the drive controller 101, to which the seamless control signal Scsl is inputted, outputs a drive signal SD to the spindle motor 102 or the slider motor 103. By this drive signal SD, the spindle motor 102 or the slider motor 103 moves the optical pickup 80 such that the record position to be reproduced on the DVD 1 is irradiated with the light beam B (refer to an arrow of a broken line in FIG. 12), and the spindle motor 102 CLV-controls (Constant Linear Velocity-controls) the rotation number of the DVD 1. Along with this, the drive controller 101 outputs the aforementioned switch signal Ssw1 on the basis of the seamless control signal Scsl, so as to open the stream switch 82 when the demodulation signal Sdm is not outputted from the demodulate and correct unit 81 while the optical pickup 80 is being moved, and so as to close the stream switch 82 when the demodulation signal Sdm is started to be outputted, so that the demodulation signal Sdm is outputted to the track buffer 83.

Now, description will be given of operation of the above-described reproduction apparatus S2, especially the system controller 100 of the present invention on the basis of a flow chart as shown in FIG. 13.

FIG. 13 shows an example of a flow chart of a normal reproduction operation of the DVD 1 and a defect process in which the Video Object Identification Information (VOB_ID, VOB_ID') is utilized. Here, description will be given on the assumption that the picture A in the example as shown in FIGS. 5 to 7 is selected by a user.

(1) Normal Reproduction Operation

First, there will be explained the normal reproduction operation (i.e., a reproduction operation where a logical address can be searched (YES in the step S4)) which was described with reference to FIG. 7 in the embodiment of the information record medium.

The system controller 100 causes the optical pickup 80 to move ahead of the VTS, continuously reads out necessary information, and causes the reproduction control information (PGCI) to be stored in the memory (RAM 100a) of the system controller 100. The start address A1 is read out from the reproduction control information (PGCI) thus stored to conduct a search for the logical address A1 (Step S2). Then, the system controller 100 judges as whether the logical address A1 has been searched (Step S4). When the logical address A1 has been searched (YES in the Step S4), the system controller 100 acquires the navi-pack (Step S20) so as to reproduce the interleaved unit (Step S22). Then, the system controller 100 judges as whether the stop key has been pushed (Step S24). When the stop key has been pushed (YES in the Step S24), the system controller 100 causes the reproduction to be stopped (Step S30). When the stop key has not been pushed (NO in the Step S24), the system controller 100 judges as whether the logical address of the reproduced interleaved unit has reached the end address (Step S26). When the logical address of the reproduced interleaved unit has not reached the end address (NO in the Step S26), the steps S22 and S24 are repeated. When the logical address of the reproduced interleaved unit has reached the end address (YES in the Step S26), on the other hand, the search for the next address or the destination address is conducted (Step S28). The above-mentioned steps are repeated until the stop key is pushed in the step S24.

(2) Defect Process

Then, there will be explained the defect process (i.e., a process where the logical address A1 cannot be searched (NO in the step S4)).

When the logical address A1 cannot be searched in the step S4, the system controller 100 judges as whether the search of the logical address is to be conducted again (retried) (Step S6). Here, it is assumed that retrial of the search is made several limited times. When the retrial thereof is made (YES in the step S6), the above-mentioned steps S4 and S6 are repeated so as to conduct the searches of the logical address A1 (Step S8). If the logical address A1 cannot be searched even after the completion of several times of retrial (NO in the step S6), the Video Object Identification Information (VOB_ID) is acquired from the reproduction control information (PGCI) stored in the memory (Step S10). Then, the system controller 100 judges as whether the logical address of the data under search is larger than A1 (Step S11), and the search for data subsequent to the logical address of the data under search is conducted until the logical address of the data under search becomes larger than A1 (Step S12). When the logical address of the data under search is larger than A1 (YES in the Step S11), the data on the searched track is read out (Step S13), it is judged as whether the thus read-out data is a navi-pack (Step S14). The step S13 is repeated until the navi-pack is read out. When the navi-pack is read out (YES in the Step S14), there is read out the Video Object Identification Information (VOB_ID') for identifying the VOB to which the data recorded in the navi-pack, and subsequent thereto belong (Step S16).

Then, the system controller 100 judges as whether the Video Object Identification Information (VOB_ID) recorded in the reproduction control information (PGCI) is identical with the Video Object Identification Information (VOB_ID') recorded in the navi-pack (Step S18). When they are not identical with each other (NO in the Step S18), the above-mentioned steps S13 to S18 are repeated. When the Video Object Identification Information (VOB_ID) recorded in the reproduction control information (PGCI) is identical with the Video Object Identification Information (VOB_ID') recorded in the navi-pack (YES in the Step S18), on the other hand, the above-described normal reproduction is resumed so as to repeat the above-mentioned steps S22 to S30, and S20.

According to the aforementioned construction, even when the navi-pack cannot be read out by the reproduction apparatus, or a reading-out error occurs for some reason or other (NO in the Step S4), as described above, the reproduction of the interleaved unit can be continued by searching the Video Object Identification Information (VOB_ID') in the navi-pack included in the real time data, which is identical with the Video Object Identification Information (VOB_ID) recorded in the reproduction control information (PGCI).

Although the defect process is described as being carried out at the start of the reproduction in the flow chart, the defect process described with reference to FIG. 13 may be used in the normal reproduction, when it is impossible to make a return to the step S20 due to a failure in the reading out of the next address or the destination address, which is set in the step S28, or due to occurrence of a reading-out error in the navi-pack indicated by that address.

As described above in detail, according to the information record medium of the present invention, since there are provided (1) a plurality of data groups including a plurality of data units having at least one of video information and audio information and (2) reproduction control information having the first identification information for identifying each of the plurality of data groups; and in addition the second identification information for identifying the data group to which each of the data units belongs, is recorded in each of the data units. Therefore, it is possible to continue the reproduction of the interleaved unit by searching the second identification information in the data unit, which is identical with the first identification information recorded in the reproduction control information, even when one interleaved unit cannot be reproduced for some reason or other by the reproduction apparatus.

What is claimed is:

1. An optical recording medium for storing information to be reproduced using an information reproduction apparatus including reading means for optically reading an information track on the optical recording medium and reproducing means for reproducing information from a signal obtained by the reading means, the optical recording medium comprising:

a plurality of data groups;

a plurality of interleaved units, the interleaved units which belong to different ones of the data groups being recorded in an interleaved manner;

a plurality of data group units, each of the interleaved units comprising at least one of the data group units, wherein each of the plurality of data group units includes navigation information and at least one of video information and audio information; and reproduction control information for controlling presentation of the data groups, the reproduction control information being recorded at a location separate from the data group units and including first identification information identifying a specific one of the data groups, wherein the navigation information of each of the plurality of the data group units includes second identification information for identifying the data group to which the data group unit including that navigation information belongs.

2. The optical recording medium according to claim 1, wherein the first identification information and the second identification information are used by the reproducing means to reacquire data reproduction after a read-out error.

3. The optical recording medium according to claim 1, wherein each of the plurality of data groups includes at least one of multiple versions portions of a title, and wherein the first and second identification information include information identifying a version of the title.

4. An information recording apparatus for recording information on an optical recording medium, comprising:

first recording means for recording a plurality of data groups;

second recording means for recording a plurality of interleaved units such that the interleaved units which belong to different ones of the data groups are recorded in an interleaved manner;

third recording means for recording a plurality of data group units such that at least one of the data group units forms each of the interleaved units, each of the plurality of data group units including navigation information and at least one of video information and audio information; and fourth recording means for recording reproduction control information used for controlling a presentation of the data groups and being recorded at a location separate from the data group units, the reproduction control information including first identification information identifying a specific one of the data groups, wherein the navigation information of each of the plurality of the data group units includes second identification information for identifying the data group to which that data group including that navigation information belongs.

5. The information recording apparatus according to claim 4, wherein the first identification information and the second identification information are used by the reproducing means to reacquire data reproduction after a read-out error.

6. The information recording apparatus according to claim 4, wherein each of the plurality of data groups includes at least one of multiple version portions of a title, and wherein the first and second identification informations include information identifying a version of the title.

7. An information reproducing apparatus for reproducing information from an optical recording medium, the optical recording medium comprising:

a plurality of data groups;

a plurality of interleaved units, wherein the interleaved units which belong to different data groups are recorded in an interleaved manner;

a plurality of data group units, each of the interleaved units comprising at least one of the data group units, wherein each of the plurality of data group units includes navigation information and at least one of video information and audio information; and reproduction control information for controlling a presentation of the data groups and recorded at a location separate from the data group units, the reproduction control information including first identification information identifying the data group unit including that navigation information belongs, wherein the navigation information of each of the plurality of the data group units includes second identification information for identifying one of the plurality of data groups to which each of the plurality of data group units belongs;

the information reproducing apparatus comprising:

first reading means for reading the reproduction control information including the first identification information;

second reading means for sequentially reading the plurality of data group units to obtain the second identification information of the plurality of data group units;

judging means for judging identity of the first identification information with the second identification information; and reproduction means for reproducing information from data group units having the second identification information identical to the first identification information.

8. The information reproducing apparatus according to claim 7, wherein the first identification information and the second identification information are used by the reproducing means to reacquire data reproduction after a read-out error.

9. The information reproducing apparatus according to claim 7, wherein each of the plurality of data groups includes at least one of multiple version portions of a title, and wherein the first and second identification information include information identifying a version of the title.

10. The optical recording medium according to claim 1, wherein the first identification information is recorded in a first hierarchical level of data configured for control of the presentation of all of the data groups, and wherein the second identification information is recorded at a second hierarchical level of data, different than the first, configured for control of the presentation of at least a portion of only one of the plurality of data groups.

11. The optical recording medium according to claim 1, wherein the first and second identification information contain at least some of the same information such that it is possible to continue interleaved unit reproduction even if the navigation information of one of the plurality of data group units cannot be read out due to error.

12. The information recording apparatus according to claim 4, wherein the first identification information is recorded in a first hierarchical level of data configured for control of the presentation of all of the data groups, and wherein the second identification information is recorded at a second hierarchical level of data, different than the first, configured for control of the presentation of at least a portion of only one of the plurality of data groups.

13. The information recording apparatus according to claim 4, wherein the first and second identification information contain at least some of the same information such that it is possible to continue interleaved unit reproduction even if the navigation information of one of the plurality of data group units cannot be read out due to error.

14. The information reproducing apparatus according to claim 7, wherein the first identification information is recorded in a first hierarchical level of data configured for control of the presentation of all of the data groups, and wherein the second identification information is recorded at a second hierarchical level of data, different than the first, configured for control of the presentation of at least a portion of only one of the plurality of data groups.

15. The information reproducing apparatus according to claim 7, wherein the first and second identification information contain at least some of the same information such that it is possible to continue interleaved unit reproduction even if the navigation information of one of the plurality of data group units cannot be read out due to error.

* * * * *

UNITED STATES PATENT AND TRADEMARK OFFICE
CERTIFICATE OF CORRECTION

PATENT NO. : 6,031,962
DATED : February 29, 2000
INVENTOR(S) : Yamamoto et al.

It is certified that error appears in the above-identified patent and that said Letters Patent is hereby corrected as shown below:

On the Title Page:
[75] Inventorship and addresses should be changed to to Kaoru Yamamoto, Tsurugashima-shi; Ryuichiro Yoshimura, Tokorozawa-shi; Takao Sawabe, Tokyo-to; Yoshiaki Moriyama, Tsurugashima-shi; Akihiro Tozaki, Tsurugashima-shi and Junichi Yoshio, Tokorozawa-shi; all of Japan.

[73] Assignee should be changed to Pioneer Electronic Corporation.

Column 20,
Line 49, insert "unit" after --group--.

Column 21,
Line 10, insert "the data group to which" after --identifying--.

Signed and Sealed this

Nineteenth Day of June, 2001

Attest:

NICHOLAS P. GODICI
Attesting Officer
Acting Director of the United States Patent and Trademark Office